United States Patent
Hong

(10) Patent No.: US 7,596,450 B2
(45) Date of Patent: Sep. 29, 2009

(54) STRIDE-BASED ROUTE GUIDING APPARATUS AND METHOD

(75) Inventor: Hyun-Su Hong, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 800 days.

(21) Appl. No.: 11/329,613

(22) Filed: Jan. 11, 2006

(65) Prior Publication Data

US 2006/0184320 A1 Aug. 17, 2006

(30) Foreign Application Priority Data

Feb. 11, 2005 (KR) .................. 10-2005-0011636

(51) Int. Cl.
*G01C 21/36* (2006.01)
*G01S 5/02* (2006.01)
*G06F 19/00* (2006.01)

(52) U.S. Cl. .................. 701/209; 701/200; 701/213; 701/201; 340/996; 342/357.06

(58) Field of Classification Search .................. 701/209, 701/200, 201, 213; 340/996, 988; 342/357.06; 702/141
See application file for complete search history.

(56) References Cited

U.S. PATENT DOCUMENTS 6,522,266 B1 *  2/2003  Soehren et al. ............. 340/988
7,245,254 B1 *  7/2007  Vogt ....................... 342/357.06
2004/0059548 A1  3/2004  Kagarlis
2004/0064286 A1 *  4/2004  Levi et al. .................. 702/141
2004/0102931 A1  5/2004  Ellis et al.
2005/0033515 A1  2/2005  Bozzone

FOREIGN PATENT DOCUMENTS

| EP | 1 258 706 | 11/2002 |
|---|---|---|
| JP | 08-038462 | 2/1996 |
| JP | 10-043351 | 2/1998 |
| JP | 10-318777 | 12/1998 |
| JP | 11-037786 | 2/1999 |
| JP | 2001-027545 | 1/2001 |
| JP | 2001-272247 | 10/2001 |

* cited by examiner

*Primary Examiner*—Tan Q Nguyen
(74) *Attorney, Agent, or Firm*—The Farrell Law Firm, LLP

(57) ABSTRACT

Disclosed is a stride-based route guiding apparatus and method capable of providing a pedestrian with a stride-based route. The method includes detecting a stride of the pedestrian on the basis of a pace inherent to the pedestrian of interest and converting a remaining distance from a current position to a major position or destination into the number of steps so as to provide the pedestrian with the number of steps to the major position or destination when a route is shown, using a navigation system built in a mobile terminal. Since the route is shown on the basis of the number of steps inherent to the pedestrian, the pedestrian can receive the routing more familiar to herself or himself, and easily and intuitively perceive the route from the current position to the major position or destination.

22 Claims, 4 Drawing Sheets

STRIDE-BASED ROUTE GUIDING APPARATUS AND METHOD

PRIORITY

This application claims priority to an application entitled "Stride-based Route Guiding Apparatus and Method" filed in the Korean Industrial Property Office on Feb. 11, 2005 and assigned Serial No. 2005-11636, the contents of which are incorporated herein by reference.

BACKGROUND OF THE INVENTION

1. Field of the Invention

The present invention relates to an apparatus and method for guiding a route, and more particularly, to a stride-based route guiding apparatus and method capable of providing a pedestrian with a stride-based route through a personal navigation system.

2. Description of the Related Art

In general, a navigation system provides information on a current position of a moving object and route information from the current position to a destination. Various moving objects, for example, vessels, air crafts, vehicles, pedestrians, etc., may include or carry a navigation system if necessary. Although such a navigation system has been mainly utilized as a requisite equipment in aircrafts or vessels, adoption of the navigation system in vehicles has recently been popularized. In particular, the use of personal navigation systems is increasing.

A car navigation system provides a driver with a route from a current position to a destination on an electronic map and information on the remaining distance and traveling direction from the current position to a major routing position such as an intersection ahead of the major routing position so that he/she can drive the car along a traveling route without deviating from the route. Also, a personal navigation system (PNS) provides a pedestrian with information on the remaining distance and traveling direction from the current position to a major routing position such as an intersection ahead of the major routing position. The navigation system provides the pedestrian with other information including the remaining distance from the current position to the destination and an estimated necessary time from the current position to the destination. Furnishing of the routing information is referred to as routing guidance. The routing guidance provides the routing information based on positioning information regarding the current position to the driver or pedestrian.

Several position measuring techniques to measure the current position of the moving object (for example, a vehicle, vessel, pedestrian, or the like) have been developed. As one example of the position measuring techniques, a positioning technique using a so-called "Dead Reckoning (DR)" approach has been proposed. The positioning technique using the dead-reckoning process recognizes a relative user's position and traveling direction on the basis of the previous position information. Specifically, the positioning technique using the DR approach generally measures the traveling distance and direction of the moving object using a sensor for sensing a rotary motion (for example, a gyroscope) and a sensor for sensing a rectilinear motion (for example, accelerometer). Consequently, the measuring techniques using the DR approach need these sensors. For example, various navigation systems for vehicles, vessels, or pedestrians include sensors to measure the traveling direction and distance of the vehicles, vessels, or pedestrians. The sensors can be used in the navigation systems irrespective of the kind of the vehicles, vessels, or pedestrians.

The navigation system provides the remaining distance from the current position to the major position or destination in a standard distance unit such as a meter or mile. For example, a route guiding message, such as, "Turn right 30 meters ahead." or "Go straight on at an intersection 20 meters ahead." is outputted through a screen or loudspeaker.

As described above, in the case in which the method of notifying the remaining distance to a major position or destination in a standard length unit is applied to a pedestrian, it is not helpful to the pedestrians having differently sized strides in intuitively perceiving the remaining distance, unlike a vehicle. Also, the method of notifying the remaining distance to the major position or destination in the standard length unit is not based on the pedestrian's stride, and thus the pedestrian may not find this convenient.

SUMMARY OF THE INVENTION

Accordingly, the present invention has been designed to solve the above and other problems occurring in the prior art, and provides a stride-based route guiding apparatus and method that can provide a pedestrian with a stride-based route.

In order to accomplish the above and other objects, there is provided a stride-based route guiding apparatus including a sensor for sensing and outputting a stride of a pedestrian, a stride detecting unit for detecting the stride by extracting a feature repeated at the stride of the pedestrian from an output pattern of the sensor; a pace setting unit for estimating a pace of the pedestrian using a stride frequency according to a size of variance of the sensor value and a result of stride detection; a route information providing unit for calculating a traveling distance to a specific position in terms of the number of steps; and a control unit for performing a route guidance using the number of steps outputted from the route information providing unit during the route guidance.

In another aspect of the present invention, there is provided a stride-based route guiding method including detecting a stride of a pedestrian according to a stride feature or situation of the pedestrian during a route guidance, calculating a traveling distance by measuring a current position of the pedestrian, setting a pace of the pedestrian using a result of stride detection and the calculated traveling distance, calculating a distance from the pedestrian to a specific position, calculating the number of steps corresponding to the distance to the specific position using a result of pace setting and the calculated distance, and providing a route guiding message based on the number of steps using a result of calculating the number of steps and the calculated remaining distance.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
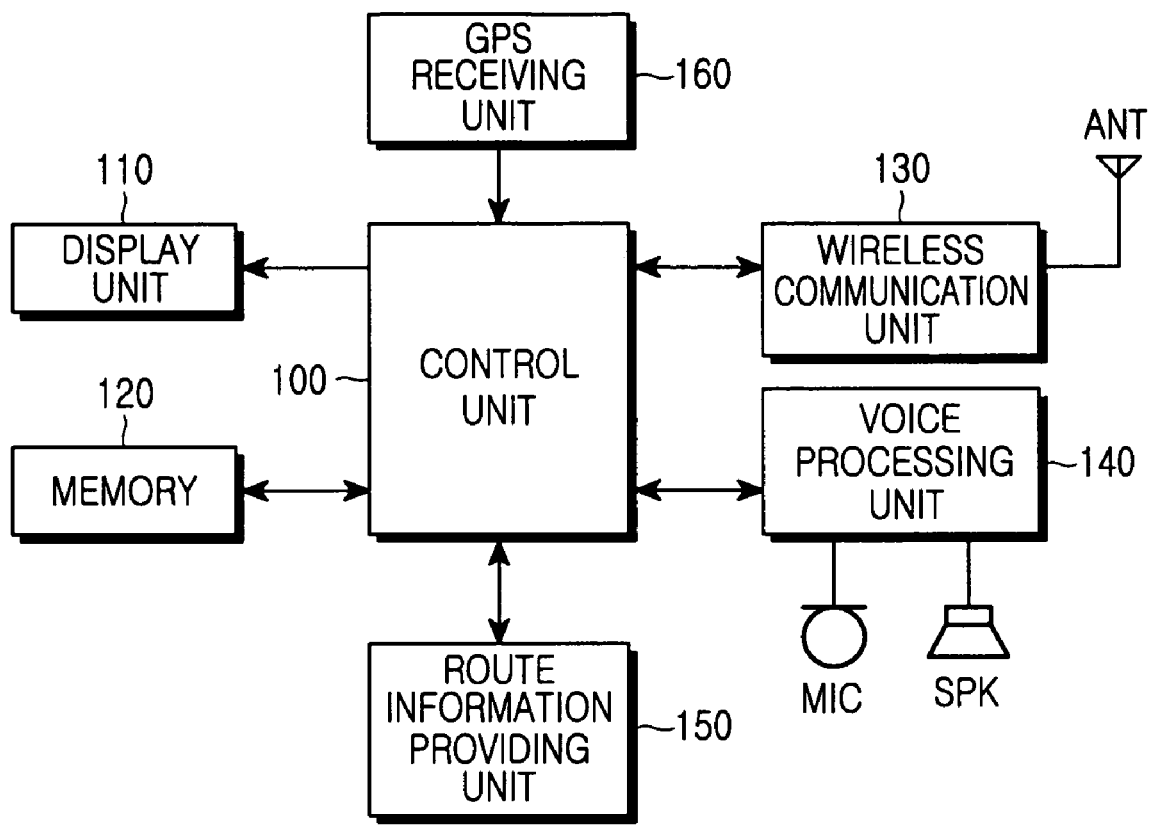
FIG. 1 is a block diagram of a mobile terminal capable of performing a stride-based route guiding function according to an embodiment of the present invention.

Preferred embodiments of the present invention will be described in detail hereinafter with reference to the accompanying drawings. In the following description of the present invention, the same drawing reference numerals are used for the same elements even in different drawings. Additionally, a detailed description of known functions and configurations incorporated herein will be omitted when it may obscure the subject matter of the present invention.

The present invention provides a pedestrian with a stride-based route guiding function. Accordingly, the present invention includes detecting the stride of the pedestrian on the basis of a pace inherent to the pedestrian of interest and converting a remaining distance from a current position to a major position or destination into the number of steps so as to provide the pedestrian with the number of steps to the major position or destination when a route is shown, using a mobile terminal with a navigation system. Since the route is shown on the basis of the number of steps inherent to the pedestrian, the pedestrian can receive the routing more familiar to herself or himself, and easily and intuitively perceive the route from the current position to the major position or destination.

Construction and operation of the mobile terminal embodying the above function will be now described with reference to the block diagram of the mobile terminal capable of performing a stride-based route guiding function of FIG. 1. Referring to FIG. 1, the navigation system built-in mobile terminal includes a control unit 100, a display unit 110, a memory 120, a wireless communication unit 130, and a voice processing unit 140.

The control unit 100 controls the operation of the navigation system. Specifically, when the navigation system is in a pedestrian mode, the control unit 100 receives information on the destination from the pedestrian, and sets an optimum route to the destination. The control unit 100 calculates the current position on the basis of a traveling distance related to the pace of the pedestrian of interest or the traveling direction sent from a route information providing unit 150, or a GPS signal received from a GPS satellite by GPS receiving unit 160.

Then, the control unit 100 controls the route information providing unit 150 to convert the traveling distance of an optimum route to be traveled into the number of steps of the pedestrian of interest. Specifically, the route information providing unit 150 converts the distance from the current position to the specific destination into the number of steps to output it to the control unit 100. The control unit 100 outputs the stride-based route guiding message through the display unit 110 or the voice processing unit 140. In order to convert the traveling distance on the route into the number of steps, the pace of the pedestrian of interest should be figured out. Since the pace is peculiar to the pedestrian, if the pace is fixed as a given value, a pace error will occur. Consequently, it is preferable that the stride is continuously measured while the pedestrian is walking.

Initial pace measurement may be achieved, for example, by receiving a measured pace value calculated by a route providing server connected to a base station, through an on-line manner. Alternatively, the initial pace measurement may be achieved by storing the previous pace measured value in the mobile terminal through an off-line manner.

The display unit 110 displays a map which is varied according to motion of the pedestrian when the navigation system is in the pedestrian mode, under the control of the control unit 100. The major position or destination on the walking route and the route guiding message to the destination are displayed on the map.

The memory 120 stores map data to represent the map to be shown when the pedestrian moves along the route from the current position, under the control of the control unit 100. Also, the memory 120 stores an average pace of the pedestrian using the previous pace information to convert the traveling distance on the route into the number of steps of the pedestrian when the navigation system is in the initial pedestrian mode.

The wireless communication unit 130 generally serves to communicate wirelessly with the base station, and may receive the measured pace value of the pedestrian calculated by the route providing server according to the embodiment of the present invention.

A GPS receiving unit 160 receives the GPS signal from the GPS satellite to allow the destination to instantly know the position of the mobile terminal. In other words, the mobile terminal receives the GPS position information transferred from the GPS satellite through the GPS receiving unit 160.

The voice processing unit 140 receives the route information calculated by the route information providing unit 150 as voice data to output it through the loudspeaker under the control of the control unit 100, so that the pedestrian can hear it.

The route information providing unit 150 measures the stride of the pedestrian in the pedestrian mode, and converts the remaining distance from the current position to the major position or destination into a number of steps, under the control of the control unit 100. The construction of the route information providing unit 150 will now be described with reference to the block diagram of FIG. 2 according to an embodiment of the present invention.

Figure 2:
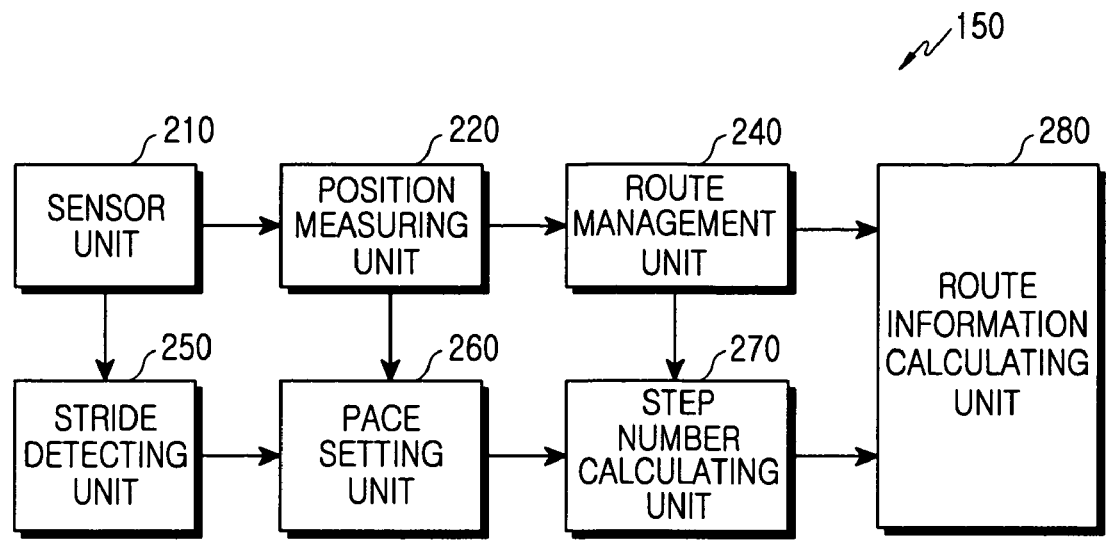
FIG. 2 is a block diagram illustrating a route information providing unit according to an embodiment of the present invention.

Referring to FIG. 2, the route information providing unit 150 includes a sensor unit 210, a position measuring unit 220, a route management unit 240, a stride detecting unit 250, a pace setting unit 260, a step number calculating unit 270, and a route information calculating unit 280.

The sensor unit 210 detects the stride of the pedestrian, and has an accelerator sensor for detecting rectilinear motion according to the embodiment of the present invention. The sensor unit 210 may include a sensor for precisely detecting the traveling distance and direction of the pedestrian, for example, a gyroscope sensor for detecting rotary motion when the pedestrian is walking, according to the embodiment of the present invention. In other words, the sensor unit 210 detects the traveling distance and direction of the pedestrian using any one of the accelerator sensor for detecting the stride of the pedestrian and the gyroscope sensor for detecting the rotary motion.

Figure 3:
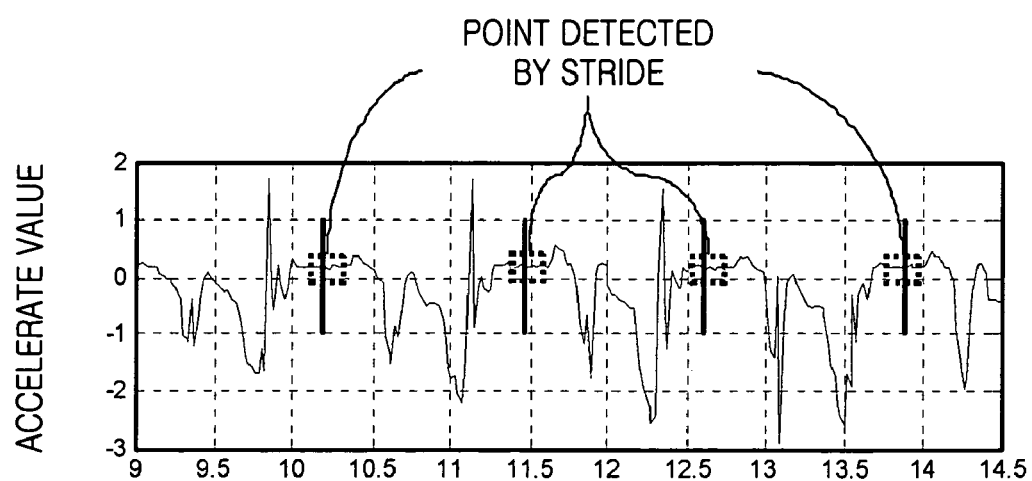
FIG. 3 is a view illustrating an example of accelerator sensor values when a pedestrian is walking.

The stride detecting unit 250 extracts a feature repeated at the stride of the pedestrian from the output pattern of the sensor unit 210 to detect the stride. Specifically, the stride detecting unit 250 detects the stride from the accelerator value outputted from the sensor unit 210. FIG. 3 is a graph illustrating an example of the accelerator sensor values when the pedestrian is walking. Referring to FIG. 3, if an output waveform of the sensor unit 210 represents a pattern having a repeated period according to the stride of the pedestrian, the output pattern of the sensor unit 210 may be differently represented depending upon the stride feature of the pedestrian. At this time, if the pace of the pedestrian is measured by stride detection only, an dynamic error may be accumulated by the fixed pace in view of a dynamic stride. Hence, the pace may be measured every desired period or stride to minimize the error.

The stride detecting unit 250 extracts the feature repeated at the stride of the pedestrian from the output pattern of the sensor unit 210, as shown in FIG. 3, to detect the stride. Specifically, the stride detecting unit 250 calculates a basic stride frequency from the output pattern of the accelerator value, as shown in FIG. 3, to detect the stride of the pedestrian. The stride detecting unit 250 detects the stride feature of the pedestrian or the stride according to circumferences. The detected stride, i.e., the number of actual steps of the pedestrian which is measured along the traveling distance of the pedestrian is inputted to the pace setting unit 260.

The position measuring unit 220 measures the current position of the pedestrian using any one of the accelerator sensor value output from the sensor unit 210 and the GPS position information received from the GPS satellite. The position of the pedestrian is measured by the GPS manner in the embodiment of the present invention, but the present invention is not limited thereto.

If the current position of the walking pedestrian is measured as described above, it can be known how long the pedestrian travels from a point of departure. That is, if the current position of the pedestrian is measured, the position measuring unit 220 can calculate the actually traveling distance of the pedestrian from the point of departure. Hence, the position measuring unit 220 calculates the actually traveled distance of the pedestrian, as well as measuring the current position of the pedestrian. Consequently, the position measuring unit 220 outputs the current position of the pedestrian or the actually traveled distance of the pedestrian to the route management unit 240 and the pace setting unit 260.

First, in order to measure the pace, a basic stride frequency and an average pace have to be calculated. The reason is because a constant time is required when estimating the pace. At this time, the average pace is obtained using any one of an estimated value of a normal pace of the pedestrian previously stored in the memory 120, an estimated value previously stored in the route providing server, and a stationary pace value arbitrarily inputted by the pedestrian when the initial pedestrian mode is set. Hence, until a constant time required for estimating the pace arrives, the stored pace values are regarded as the average pace to perform the stride-base routing.

The pace setting unit 260 estimates the pace of the pedestrian using the stride frequency according to the variance dimension and stride detected results of the sensor unit 210. The pace setting unit 260 sets the average pace using the pace value stored in the memory 120, until the constant time required for estimating the pace arrives at the initial pedestrian mode. It is not necessary that the pace setting unit 260 receives values from the position measuring unit 220 and the stride detecting unit 250 until the constant time required for estimating the pace arrives. Then, after the constant time required for estimating the pace passes, the pace setting unit 260 estimates the average pace of the pedestrian using the number of actual steps of the pedestrian output from the stride detecting unit 250 and the traveling distance calculated by the position measuring unit 220, thereby setting it as the current stride of the pedestrian. That is, the pace setting unit 260 estimates the pace of the pedestrian using the stride frequency according to the variance dimension of the accelerate sensor values and the stride detected results. At this time, the slope of a road may be utilized. Since the stride frequency and the variance dimension of the accelerate sensor values are in a functional relation, and the slope of the road has a feature affecting the functional relation, the functional relation of the pace and input parameters may be analyzed through a learning technique using a neural network to estimate the pace of the pedestrian. Thus, the pace setting unit 260 outputs the pace estimated results obtained through the process to the step number calculating unit 270.

The route management unit 240 calculates the remaining distance from the current position to the major position or destination on the basis of the current position of the pedestrian transferred from the position measuring unit 220. Also, the route management unit 240 receives the traveling distance results of the pedestrian calculated by the position measuring unit 220, and subtracts the traveling distance from the whole distance from the departure to the destination to calculate the remaining distance from the current position to the major location or destination. Then, the route management unit 240 transfers the calculated remaining distance result to the step number calculating unit 270 and the route information calculating unit 280.

The step number calculating unit 270 calculates the number of steps, of which the pedestrian has to walk on the remaining distance, using the stride estimated result output from the pace setting unit 260 and the remaining distance result output from the route management unit 240. The step number calculating unit 270 outputs the estimated result of the number of steps to be traveled to the route information calculating unit 280. Thus, the route information calculating unit 280 generates a route guiding message using the estimated result of the remaining number of steps and the remaining distance result so as to provide the pedestrian with the stride-based routing.

Figure 4:
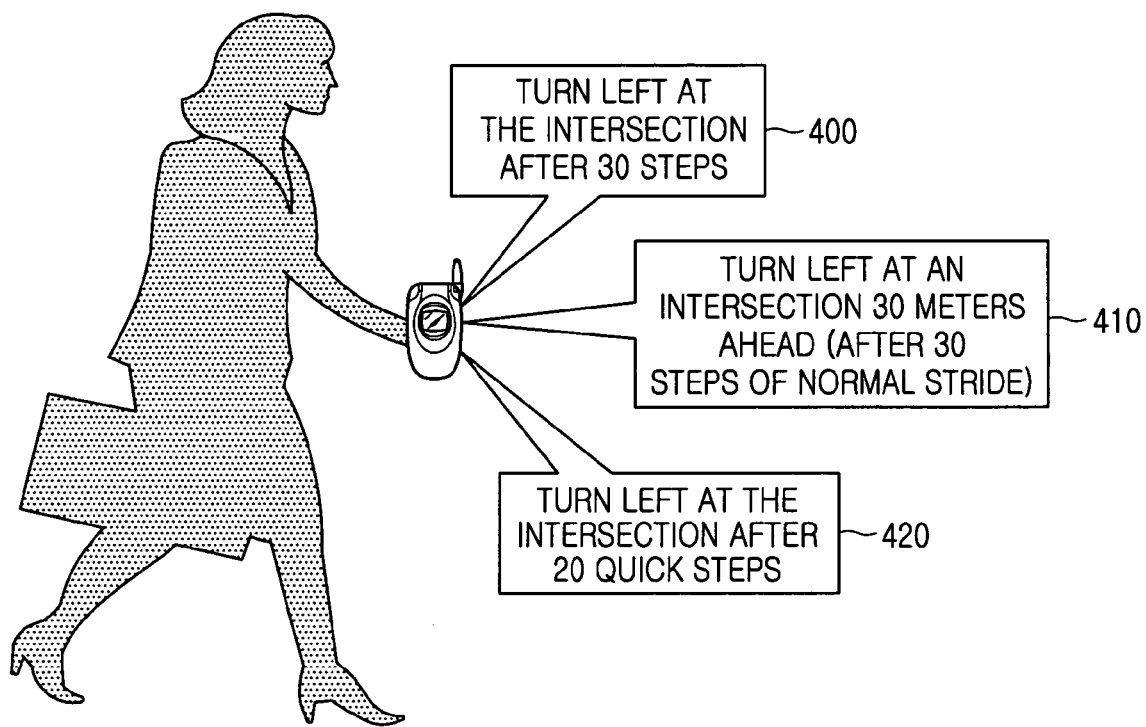
FIG. 4 is a view illustrating a ease where a pedestrian is provided with a stride-based routing when the pedestrian is walking, according to an embodiment of the present invention.

An embodiment to which the present invention is applied will now be described with reference to FIG. 4, which illustrates a case where the pedestrian is provided with a stride-based routing when the pedestrian is walking, according to an embodiment of the present invention.

The pedestrian may receive the route guiding message through the mobile terminal having a built-in navigation system while the pedestrian is walking. The number of steps to be traveled from the current position to the major position or destination is calculated by measuring the number of steps and the pace of the pedestrian in the route information providing unit 150. If there is an intersection on the route ahead of the major position while the routing is guided by the route information providing unit, the apparatus outputs the route guiding message to guide the route at the intersection. At this time, if the measured pace is 1 meter and the remaining distance is 30 meters, the route guiding message is outputted as "Turn left at the intersection after 30 steps," as indicated by reference numeral 400 in FIG. 4. At this time, the mobile terminal displays the route guiding message through the display unit 110, or outputs the route guiding message through the voice processing unit 140 as a voice.

In particular, since the pace of the pedestrian varies depending upon the stride of the pedestrian or on circumferences of the route, the present invention can output the route guiding message in view of various features of the pedestrian. For example, the traveling speed of the pedestrian is measured by detecting the stride, setting the pace, and measuring the traveling distance, while the pedestrian is walking towards the destination. Hence, an estimated traveling time from the current position to the major position or destination may be calculated using the whole distance and traveling speed from the current position to the destination.

Consequently, if the remaining distance from the current position to the destination is calculated, in addition to the traveling speed of the pedestrian, the estimated traveling time may be known. The traveling speed of the pedestrian may be applied to the stride-based routing. For example, in order to provide routing more familiar to the pedestrian, a route guiding message, such as "Turn left at the intersection after 20 quick steps," as indicated by reference numeral 420, may be outputted. At this time, the normal step speed and quick step speed of the pedestrian are based on the traveling speed previously stored in the memory 120.

According to another embodiment of the present invention, the stride-based routing may be applied to a routing of standard distance unit. For example, a route guiding message combining the distance unit and the step unit, such as "Turn left at an intersection 30 meters ahead (after 30 steps of normal stride)," as indicated by reference numeral 410, may be outputted.

The guide message, "Turn left at an intersection after 50 steps," is understood easier than the message, "Turn left at an intersection 50 meters ahead." According to the present invention, the pedestrian receiving the number of remaining steps to the major position or destination can intuitively perceive the number of remaining steps to the major position or destination while traveling on the road. The stride-based guidance is a user interface familiar with the pedestrian more than the guidance based on a standard distance.

Figure 5:
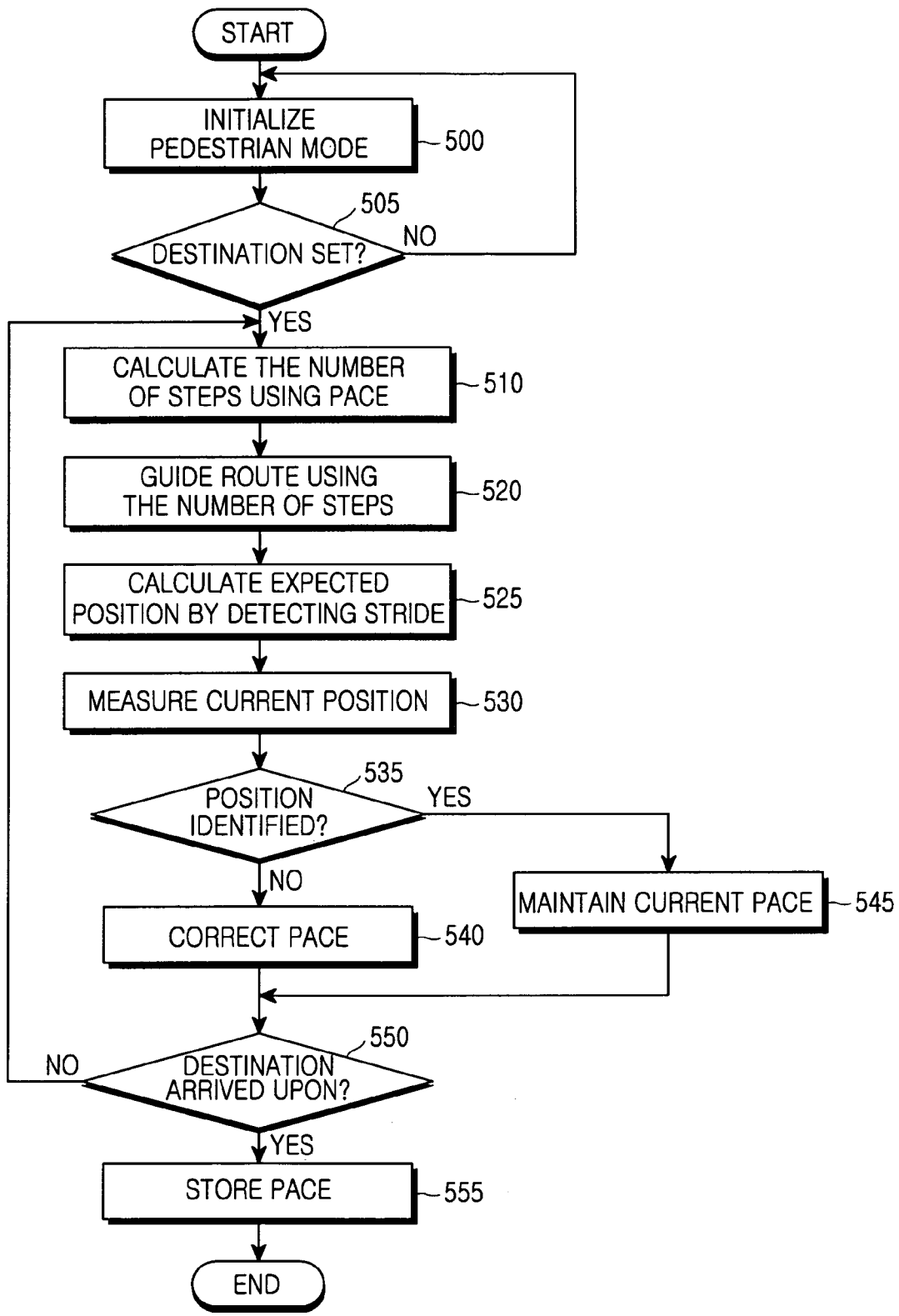
FIG. 5 is a flowchart illustrating a process of a stride-based routing according to an embodiment of the present invention.

A process of providing the routing depending upon the pace of the pedestrian through the mobile terminal having the above function will now be described with reference to FIG. 5.

When the mobile terminal is set to the pedestrian mode by the user, the control unit 100 initializes the mobile terminal according to the pedestrian mode (step 500). The control unit 100 reads the average pace value of the pedestrian previously stored in the memory 120, and transfers it to the route information providing unit 150. The pace setting unit 260 of the route information providing unit 150 sets the average pace of the pedestrian, i.e., an initial value of pace, as the pace value stored in the memory 120. Then, the control unit 100 measures whether the destination inputted by the user is set (step 505). As a result, if the destination set is completed, the optimum route is set. Hence, the control unit 100 controls the route information providing unit to set the pace value stored in the memory 120 as the average pace until the time required for estimating the pace arrives, thereby calculating the number of steps of the pedestrian along the whole distance from the departure to the destination (step 510). In other words, the control unit 100 calculates the number of steps to be traveled by dividing the remaining distance to the major position or destination on the route by the pace set value.

If the number of steps to be traveled on the remaining distance is calculated through the above process, the control unit 100 guides the route using the number of the steps (step S520). The route guiding message based on the number of the steps may be represented in various manners, as shown in FIG. 4. The display or loudspeaker may be used as a means of outputting the route guiding message.

Meanwhile, the stride-based routing using the average pace is continuously performed until the time required for estimating the pace arrives. After a constant time required for estimating the pace has passed, the current pace of the pedestrian is measured.

The number of actual steps of the pedestrian is measured, and the measured number of the steps is multiplied by the average pace, thereby obtaining the distance of the pedestrian to be traveled. Hence, the control unit 100 measures the expected position of the pedestrian through the stride detection (step 525). Then, the control unit 100 measures the current position of the pedestrian using a position measuring apparatus such as GPS (step S530). The control unit 100 compares the current position with the expected position of the pedestrian measured through stride detection (step S535). Although the case where the current position of the pedestrian is compared with the expected position is described as an example, the actual traveling distance of the pedestrian may be compared with the expected traveling distance.

If it does not identity the position in step 535, the control unit 100 corrects the pace (step 540). The pace calculation to correct the pace is performed by dividing the traveling distance calculated according to the actual position measurement of the pedestrian by the measured number of steps. If it identities the position in step 535, the control unit 100 maintains the current pace (step 545).

Then, the control unit 100 determines whether the pedestrian arrives at the destination (step 550). If it is determined in step 550 that the pedestrian does not arrive at the destination, it returns to step 510 and the control unit 100 resets the corrected pace as the average pace value to perform the routing. If it is determined in step 550 that the pedestrian arrives at the destination, the control unit 100 stores the correct pace or the current pace in the memory 120 (step 555). The pace value stored through the above manner may be used as the average pace value at the next pedestrian mode.

With the above description, the present invention performs the routing depending upon the pace of the pedestrian. In the case where there are the overpasses or underground stairs on the route of the pedestrian, the present invention may previously calculate the number of steps for them, so that the route for the overpasses or underground stairs is provided as the number of the steps. According to the present invention, also, it is possible to give a weight of the stairs according to uphill, downhill, or slope, when performing the stride-based routing.

With the above description, according to the present invention, since the number of steps is measured on the basis of the pace, the routing more familiar to the pedestrian and considering a personal feature may be provided. Also, since the routing of step unit is provide, the pedestrian can intuitively perceive the remaining distance. In addition, since the pedestrian can travel, with he or she perceiving the remaining distance by himself or herself, it is not necessary for the pedestrian to visually see the navigation system. Thus, the routing is very suitable for the visually impaired. Furthermore, in the case where there are stairs on the route, the stairs are converted into the number of steps, so that it may be utilized in a stride-based game machine.

While the present invention has been shown and described with reference to certain preferred embodiments thereof, it will be understood by those skilled in the art that various changes in form and details may be made therein without departing from the spirit and scope of the present invention as defined by the appended claims. For example, the position of the pedestrian is measured using the accelerator sensor value or GPS position information, but it may be measured by various position measuring apparatuses. It is noted that the scope of the present invention is defined by the appended claims and equivalents thereof.

What is claimed is:

1. A stride-based route guiding apparatus, comprising:
   a route information providing unit for calculating a traveling distance to a specific position in terms of a number of steps; and a control unit for performing a route guidance using the number of steps output from the route information providing unit during the route guidance, wherein the route information providing unit, comprises:

a sensor for sensing a stride of a pedestrian;

a stride detecting unit for detecting the stride by extracting a feature repeated at the stride of the pedestrian from an output pattern of the sensor; and a pace setting unit for estimating a pace of the pedestrian using a stride frequency according to a size of variance of the sensor value and a result of stride detection.

2. The stride-based route guiding apparatus as claimed in claim 1, further comprising a memory for storing an average pace value of the pedestrian.

3. The stride-based route guiding apparatus as claimed in claim 2, wherein the control unit performs the route guidance using the average pace value until a constant time arrives at the route guidance, and performs the route guidance using the number of steps output from the route information providing unit after the constant time.

4. The stride-based route guiding apparatus as claimed in claim 2, wherein the memory stores the average pace value using any one of an estimated value of a normal pace of the pedestrian previously stored according to previous pace information, an estimated value previously stored in a route providing server, and a stationary pace value arbitrarily input by the pedestrian when an initial pedestrian mode is set.

5. The stride-based route guiding apparatus as claimed in claim 2, wherein the memory stores map data for indicating a map that appears when the pedestrian moves along a route from a current position under control of the control unit.

6. The stride-based route guiding apparatus as claimed in claim 1, wherein the control unit operates to display a route guiding message which notifies a remaining distance to the specific position on the basis of the number of steps calculated by the route information providing unit on a display unit.

7. The stride-based route guiding apparatus as claimed in claim 1, wherein the control unit outputs a route guiding message which notifies a remaining distance to the specific position on the basis of the number of steps calculated by the route information providing unit, as a voice through a voice processing unit.

8. The stride-based route guiding apparatus as claimed in claim 1, wherein the sensor outputs the sensor value according to traveling of the pedestrian using any one of an accelerator sensor for detecting the stride of the pedestrian and a gyroscope sensor for detecting rotary motion of the pedestrian.

9. The stride-based route guiding apparatus as claimed in claim 1, wherein the route information providing unit further comprises:

a position measuring unit for measuring a current position of the pedestrian; and a route management unit for calculating a remaining distance to the specific position according to a resultant position value measured by the position measuring unit.

10. The stride-based route guiding apparatus as claimed in claim 9, wherein the pace setting unit sets the pace of the pedestrian using resultant values output from the stride detecting unit and position measuring unit.

11. The stride-based route guiding apparatus as claimed in claim 10, wherein the route information providing unit further comprises:

a step number calculating unit for calculating the number of steps to be traveled to the specific position using a pace setting result and the remaining distance calculated for the specific position; and a route information calculating unit for generating a route guiding message based on the number of steps using a calculated result of a remaining number of steps and the remaining distance result.

12. The stride-based route guiding apparatus as claimed in claim 9, wherein the position measuring unit calculates a traveling distance according to the current position of the pedestrian using an output value obtained by various position measuring units.

13. The stride-based route guiding apparatus as claimed in claim 9, wherein the position measuring unit measures the current position of the pedestrian using any one of a sensor value output from the sensor and GPS position information, and calculates a measured traveling distance according to the current position of the pedestrian.

14. A stride-based route guiding method comprising the steps of:

detecting a stride of a pedestrian according to one of a stride feature and situation of the pedestrian during a route guidance;

calculating a traveling distance by measuring a current position of the pedestrian;

setting a pace of the pedestrian using a result of stride detection and the calculated traveling distance;

calculating a remaining distance from the pedestrian to a specific position;

calculating a number of steps corresponding to the distance to the specific position using a result of pace setting and the calculated distance; and providing a route guiding message based on the number of steps using a result of calculating the number of steps and the calculated remaining distance.

15. The stride-based route guiding method as claimed in claim 14, further comprising the step of performing route guidance using a pace value previously stored until a constant time required for estimating the pace arrives when guiding the route.

16. The stride-based route guiding method as claimed in claim 15, further comprising the step of performing the route guidance using the number of steps calculated according to the pace of the pedestrian after a lapse of the time.

17. The stride-based route guiding method as claimed in claim 15, wherein the pace value previously stored is an average pace value using any one of an estimated value of a normal pace of the pedestrian previously stored according to previous pace information, an estimated value previously stored in a route providing server, and a stationary pace value arbitrarily inputted by the pedestrian when an initial pedestrian mode is set.

18. The stride-based route guiding method as claimed in claim 14, further comprising the steps of:

measuring a current position of the pedestrian using a position measuring device;

comparing the measured current position with an expected position; and if the measured current position is identical to the expected position, maintaining the set pace value.

19. The stride-based route guiding method as claimed in claim 18, further comprising the step of correcting the set pace value if the measured current position is not identical to the expected position.

20. The stride-based route guiding method as claimed in claim 19, wherein the pace correction is performed by dividing the traveling distance calculated according to the measurement of the current position of the pedestrian by the calculated number of steps.

21. The stride-based route guiding method as claimed in claim 14, further comprising the step of performing stride-based routing using the number of steps previously calculated and stored if one of an overpass and underground stairs are on a route of the pedestrian.

22. The stride-based route guiding method as claimed in claim 14, further comprising the step of performing stride-based routing by giving a weight of stairs according to uphill, downhill or slope.

* * * * *